P. THOMPSON.
Harvester-Rake.

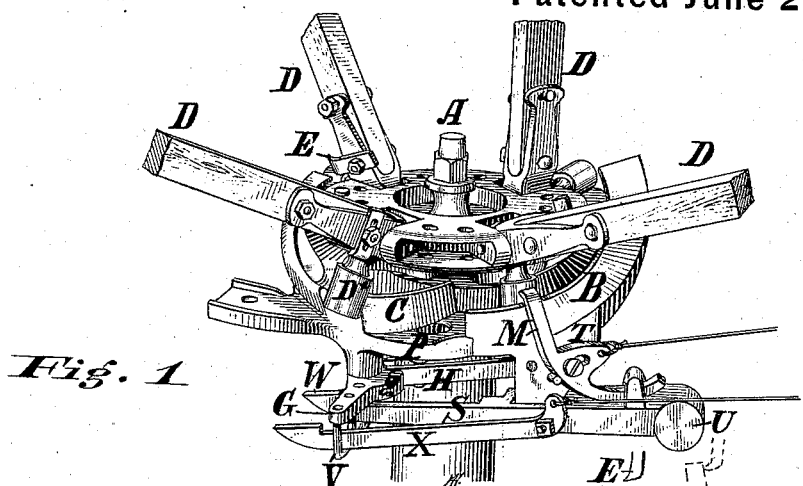
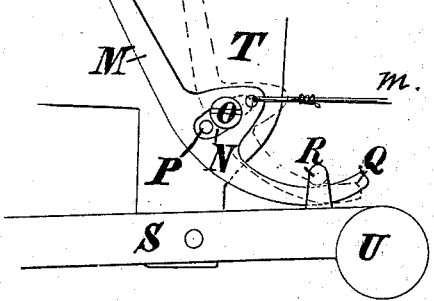
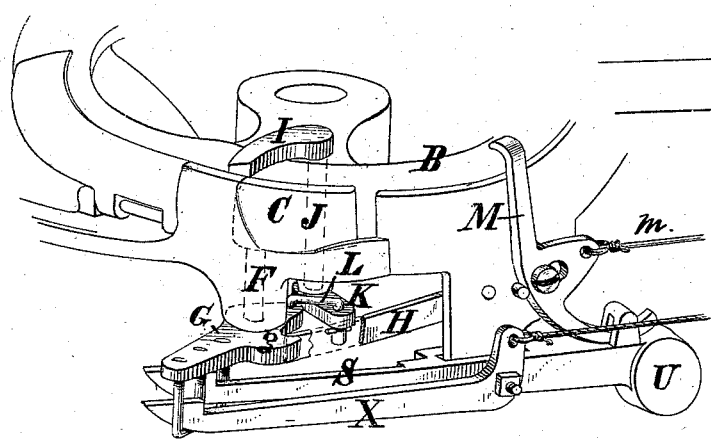
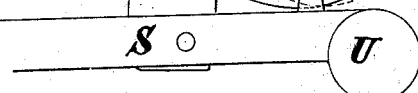

No. 229,284.  Patented June 29, 1880.

Attests
Wm Smith
John Tolley Jr

Perry Thompson
By his Attorneys,
W. C. Strawbridge,
J. Bonsall Taylor.

UNITED STATES PATENT OFFICE.

PERRY THOMPSON, OF SYRACUSE, NEW YORK, ASSIGNOR TO CHRISTOPHER C. BRADLEY, OF SAME PLACE.

HARVESTER-RAKE.

SPECIFICATION forming part of Letters Patent No. 229,284, dated June 29, 1880.

Application filed April 16, 1879.

*To all whom it may concern:*

Be it known that I, PERRY THOMPSON, of Syracuse, in the county of Onondaga and State of New York, have invented a new and useful Improvement in Harvester-Rakes, of which I do hereby declare the following to be a full, clear, and precise description, and sufficient to enable those skilled in the art to which it appertains to make and use my said invention, reference being had to the accompanying drawings, forming part of this specification, of which—

Figure 3:
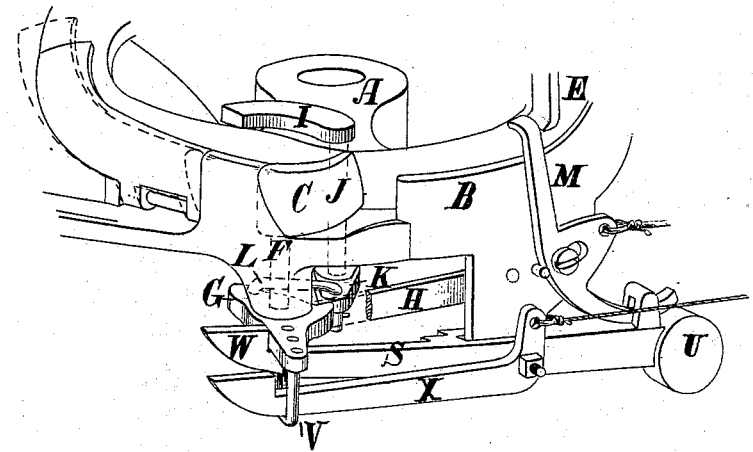
Figure 4:
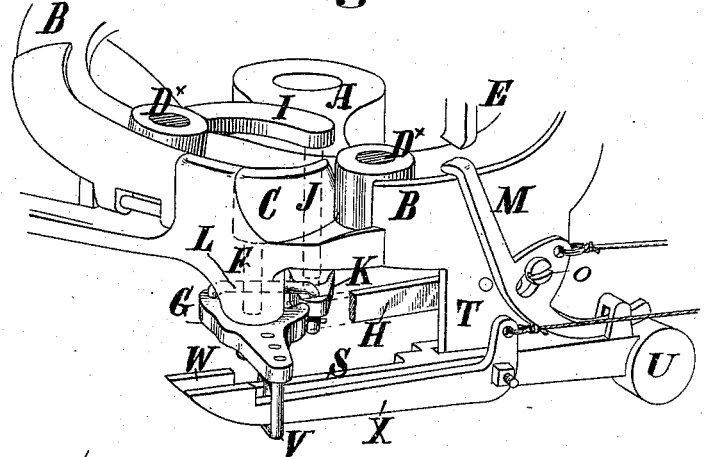

Figure 1 is a view, in perspective, of my invention applied to a harvester-rake; Fig. 2, a detailed perspective of the gate and the automatic appliances invented for opening, closing, and locking the same, the gate being open; Fig. 3, a similar view, the gate represented as locked shut by the lock-lever, the latch-lever set to be tripped; Fig. 4, a similar view, the lock-lever unlocked and the latch-lever unset, and Fig. 5, an elevational detail of the latch-lever and adjustments.

Similar letters of reference indicate corresponding parts wherever used.

My invention relates, in general, to harvester-rakes, having especial reference to an automatic mechanism for controlling the gate of the rake-cam; and it consists substantially as hereinafter set forth.

A is the rake-head standard; B the rake-camway; C its gate, and D the rake-arms, all constructed in the usual manner. E are the usual adjustable trips on the rake-arms. F is a vertical stem journaled in a bearing in the camway, to the upper end of which is affixed the gate C, and to the lower a cross-lever, G, set at about right angles to the gate. A stud, $g$, upon the lever forms a stop against which a spring, H, secured beneath the camway, acts so as to throw out the cross-lever, and consequently keep the gate open, as shown in Fig. 2. In this position all the arms rake.

I is the gate-shutting lever, hung across the interior of the camway upon the upper extremity of a stem, J, journaled vertically in the camway, to the lower extremity of which stem is a second lever, K, connected by means of a link, L, with the cross-lever G, the adjustment of connection being such that the gate and shutting-lever are hung at right angles to each other, the shutting-lever blocking the camway when the gate is open and being deflected out of the way of the rake-arm friction-rollers $D^\times$ when the gate is shut, so as not to be acted upon by them.

M is the trip-latch, Fig. 5, pivoted at O through a slot, N, in its central portion in such manner that it can be set up or down into or out of the path of the trips by means of a removable pin, P, as indicated by dotted lines in the figure above referred to. The lower extremity of the trip-latch is curved up, as shown at Q, its curved portion passing through a bearing, R, on the upper extremity of a horizontal lock-latch, S, pivoted against the camway at the portion T. The extremity of the lock-latch to which the trip-latch is connected is weighted, as shown at U, while the other extremity, which passes through a depending loop, V, in the outer end of the cross-lever, is provided with a jaw, W, to bite against and clutch the free end of the cross-lever.

X is a supplemental lock-latch similar to the first, except that it is not weighted or connected, but is controlled direct from its fulcrum by means of a cord operated by the driver, its use being to lock the cross-lever, and thereby keep the gate shut when it is desired that all the arms should reel, as in carrying the bundles around a corner.

The camway and its attached appliances, herein described, have a slight rotation about the rake-head standard A, and with relation to the rake-head and rakes, so as to enable the throwing of the gate portion forward and the reeling of longer grain, the reach of the rake-arms being greater when the gate portion is forward, while in short grain it is of advantage that the arms should strike the grain farther back and with less reach, which the backward rotation enables.

Such being the construction of my invention, it operates as follows: The trip-latch M being set up by the pin P in the position represented in Fig. 1, the lock-latch S is locked to the cross-lever G, and the spring H thereby compressed inward, the gate C being shut. As the rakes rotate, any one of the trips E being so set encounters the trip-latch, deflecting its upper and raising its lower curved end, whereby the lock-latch S is tilted, its weighted end raised, and its jaw end depressed, releasing the cross-lever, whereupon the spring, up to this point in the action compressed, acts outward against the cross-lever, throwing it out and opening the gate, at the same time, through the link-and-lever connection L J K, throwing the shutting-lever I across the camway, the device then being in the position shown in Fig. 2. The arm which has tripped the device in consequence rakes, passing through the open gate, after which it encounters the shutting-lever, which blocks its path, deflecting it completely to the side, as shown in Fig. 4, and thereby, through the link-and-lever connection, shuts the gate again, and returns the cross-lever until it passes the jaw of the lock-latch, Fig. 4, the weighted end of which, overbalancing the jaw end, elevates the jaw so as to clutch and lock the cross-lever, the adjustment being such as to secure such locking action in advance of the complete passage of the friction-roller past the shutting-lever, not giving the spring H time to recoil the cross-lever out of the way before the jaw of the lock-lever has time to clutch it.

It is obvious that the trips may be so set that only one of the arms, or so that each alternate arm, shall rake.

When it is desired that all of the arms shall reel without the trouble of unsetting such of the trips as have been previously set to trip, the pin P is pulled out, allowing the trip-latch to fall out of adjustment, as shown in Fig. 4. When, however, without altering the adjustment of either the trips or trip-latch, the pin being in and the trips being set to trip, it is desired that all the arms shall reel, for the purpose, for instance, of leaving a sheaf upon the platform in turning the machine in the field, the supplemental lock-lever X is brought into use by the driver, so as to lock the cross-lever and keep the gate shut, and the same, being unaffected by any tripping or other action, retains the gate fixedly in such position, and the rake-arms, which meanwhile trip the trip-latch and oscillate the lock-lever S, are without effect upon the action of the gate.

The trip-latch M, when the pin P is removed, is, of course, controllable by the driver by means of its cord $m$, so that it can be elevated by him to encounter such of the trips as are set to strike it when elevated, whereby, in addition to the automatic action of the parts when the pin P is in place, it becomes possible for the operator at will, and without regard to the automatic mechanism, to cause the opening or shutting of the gate, and the consequent raking or reeling of the arms at any desired point in the field.

Having thus described my invention, I claim and desire to secure by Letters Patent of the United States—

1. As an automatic mechanism for closing the gate of a harvester-rake camway so as to force any particular arm to reel, the following devices in combination, viz: a shutting-lever, I, adapted to be acted upon by a raking-arm, a lever-and-link connection, J K L, a cross-lever, G, connected with the gate, and a self-acting lock-lever, S, to clutch the cross-lever and keep the gate shut, substantially as shown and described.

2. As a device for retaining the gate of a harvester-rake camway shut throughout any stage of rotation of the rakes, or however the trips may be set, so long as one at least be set to cause raking and so long as the trip-latch is set up, a supplemental lock-latch, X, controlled by the driver, in combination with a cross-lever, G, connected with the gate, substantially as described.

3. In combination with a trip-latch hung upon a slotted pivotal bearing, O N, a removable pin, P, adapted to prop the latch up into position for action, substantially as shown and described.

4. As a means of connecting and controlling the relative position of the camway-gate C, a shutting-lever, I, the stems J and F, levers K and G, and link L, in combination, as shown and described.

PERRY THOMPSON.

Witnesses:
C. W. SMITH,
L. M. THOMPSON.